INVENTORS
EDWARD H. POINDEXTER
HENRY C. TORREY

BY *Frank E. Johnston*
*George W. Wasson*
ATTORNEYS

United States Patent Office 3,096,476
Patented July 2, 1963

3,096,476
OVERHAUSER EFFECT WELL LOGGING
Edward H. Poindexter, Anaheim, Calif., and Henry C. Torrey, Highland Park, N.J., assignors to California Research Corporation, San Francisco, Calif., a corporation of Delaware
Filed Sept. 2, 1958, Ser. No. 758,383
9 Claims. (Cl. 324—.5)

This invention relates to well logging, and more particularly to a method and apparatus for enhancing nuclear magnetism logging of an earth formation.

In the copending application of Paul E. Baker et al., Serial No. 337,384, filed February, 17, 1953, for Analytical Device, and in the application of Robert R. Unterberger, Serial No. 745,959, filed July 1, 1958, for Electron Paramagnetic Resonance Well Logging, both of which are assigned to the assignee of the present application, the arts of logging an earth formation by the method of detecting nuclear magnetism signals and by the method of detecting electron paramagnetic resonance signals, respectively, have been disclosed. In the Baker et al. application the penetrated earth formation adjacent to the face of a well bore is logged for the presence of spinning protons. In an earth formation these protons are present within the atoms of hydrogenous fluids such as hydrocarbons and water. The Baker et al. application further discloses a method for distinguishing hydrocarbons from water by investigating certain characteristics of the nuclear magnetism signals derived from the spinning protons, characteristics that may be affected by the molecular environment of the protons producing the signals, so as to indicate whether the protons are associated with oil in the form of hydrocarbons, or with water.

In the application of Robert R. Unterberger, a method and apparatus are disclosed for logging an earth formation penetrated by a well bore through the detection of resonance between an oscillating electromagnetic field and spinning, uncompensated electrons found in certain hydrocarbon crudes. In the Unterberger application, a direct detection logging method is disclosed whereby crude oils may be distinguished from water within the formation, since the uncompensated spinning electrons are usually present in the crude hydrocarbons only and not in water.

This present invention discloses a method and apparatus combining certain features of the aforementioned methods with newly discovered modifications to further enhance the diagnostic information obtainable from a nuclear magnetism log of an earth formation through the investigation of both the nuclear spin characteristics and the electron spin characteristics of the fluids surrounding the well bore penetrating the earth formation. This investigation is made possible through the interrelation of the relaxation processes associated with both spinning nuclear particles and uncompensated spinning electrons within the atomic structures of fluids within the formation.

Common to both nuclear magnetism logging and electron paramagnetic reasonance logging is the precession of the spinning atomic particles, protons in the one case and electrons in the other, about a magnetic field of a substantially homogeneous character, as for instance the earth's magnetic field. In nuclear magnetism logging, the protons within the nuclei of hydrogen atoms are initially polarized to institute a preferred orientation parallel to a field having a direction at an angle to the earth's magnetic field. Upon the termination of the polarization field, the oriented protons tend to precess around the direction of the earth's magnetic field. This precessional movement of the spinning protons may be detected to establish a signal indicating the presence of protons in a fluid within the formation.

In the case of electron paramagnetic resonance, uncompensated spinning electrons, influenced by an external magnetic field, are in a condition of precession about the magnetic field. It is known that a plurality of these uncompensated spinning electrons may be brought into an inphase precession through the irradiation of the material in which they are contained with an electromagnetic field oscillating at the frequency corresponding to the electron precession. Electron paramagnetic resonance is detected by the absorption of energy from the irradiating electromagnetic field as the electrons are brought into inphase precession.

The foregoing paragraphs present brief discriptions of nuclear magnetism and electron paramagnetic resonance measurements. From those paragraphs it may be seen that hydrogenous fluids within an earth formation may be detected by nuclear magnetism measurements and that hydrocarbon crudes may be identified by electron paramagnetic resonance measurements. It should be noted that while the nuclear magnetism signals alone may not be distinctive of hydrocarbon crude in that they are derived from spinning protons that may be associated with either water or hydrocarbons, electron paramagnetic resonance measurements may actually distinguish hydrocarbon crudes from water, since the uncompensated electrons contributing to the paramagnetic resonance signal are usually present only in the hydrocarbon crude form of hydrogenous fluids within the formation, and not in water. However, there are certain unusual circumstances in which even electron paramagnetic resonance signals may not provide unambiguous indications. Some formation waters may contain paramagnetic ions and could give rise to electron resonance signals. Furthermore, even some rocks may be able to produce electron resonance signals.

The method of the present invention makes use of the fact that nuclear magnetic resonance and electron paramagnetic resonance are not necessarily strictly independent phenomena. There are intra-atomic, inter-atomic, and even inter-molecular coupling mechanisms whereby protons and adjacent unpaired electrons may interact. If the unpaired electrons are stimulated into resonance during a nuclear magnetic experiment, the nuclear magnetic signal itself may be affected. The effect may take the form of a change in the amplitude, or the phase, or the envelope shape of the nuclear magnetic signal.

Investigations of this interaction of protons and electrons (commonly called the Overhauser effect) have been made for several combinations of hydrogenous solvents with dissolved or suspended free radicals, which have uncompensated electron spins. In these investigations the effect manifests itself as an initial decrease in nuclear polarization as the electron stimulation by a radio-frequency field is increased. The nuclear polarization becomes zero for some value of electron stimulation, and then commences to grow in the negative sense with still further electron stimulation. The net proton polarization produced depends upon the degree to which the applied radio frequency field is able to saturate the electron resonance itself, that is, to furnish as much power to the electrons as they are able to dissipate through the electron relaxation process into other forms of energy. It has been predicted and observed that in the case of paramagnetic ions (as opposed to free radicals) dissolved in water, it is very difficult to induce an observable polarization of protons. This is because the relaxation processes associated with the electrons in paramagnetic ions are so effective in dissipating the energy of excited electrons that it is not practicable with the apparatus as contemplated herein or with available laboratory apparatus to provide enough radio frequency power to saturate the electron resonance.

In underground formations, free radicals are to be found almost exclusively in hydrocarbon solutions and suspensions, as crude oil, and not in water. The asphaltene free radical in particular is a common constituent of crude oils. Paramagnetic ions, however, may be found dissolved in both water and oil. In addition to the solutions and suspensions mentioned above, water relatively free of paramagnetic ions may be found underground.

In view of the above considerations, it may be seen that a new and novel method has been discovered for distinguishing crude oil from water within an earth formation.

The difference in behavior with respect to proton polarization under the action of electron stimulation of the usual hydrocarbon and water solutions in underground formations makes it possible to distinguish water solutions and pure water from crude oils containing free radicals by observing whether changes may be produced in the nuclear magnetic signal by the systematic application of radio-frequency energy during at least a part of a nuclear magnetism logging operation. According to this procedure, nuclear magnetism well logging operations are first performed without electron stimulation and then with electron stimulation. The corresponding nuclear magnetic signals are detected and compared. It may be concluded that if there is a noticeable alteration in the amplitude or envelope shape of the nuclear magnetic precession signal from the fluid protons, the formation fluid must include hydrocarbon crude. On the other hand, if not change in the nuclear magnetism signal is detected, the protons contributing to the signal are probably present only in the form of water, even though in rare cases they could be present in a light hydrocarbon of the condensate type, containing no asphaltenes. In this manner, a distinction may be made between the two usual sources of hydrogenous fluids within a formation with a substantially unequivocal distinction between the hydrocarbon fluids and the water fluids.

From the foregoing paragraphs it may therefore be seen that the object of the present invention is a method and apparatus for performing nuclear magnetism well logging operations in a manner whereby the presence of crude oil and water within a penetrated earth formation may be determined along with a distinction of one from the other.

A further object of the present invention is a modified nuclear magnetism well logging operation whereby effects of electron resonance upon nuclear magnetism signals may be observed in hydrogenous fluids in and around an earth formation penetrated by a well bore.

A still further object of the present invention, in accordance with the preceding objects, is a method for quantitative determination of the presence of crude oil within a penetrated earth formation.

Further objects and features of the present invention will be readily apparent to those skilled in the art from the specification and appended drawings illustrating a certain preferred embodiment in which.

Figure 1:
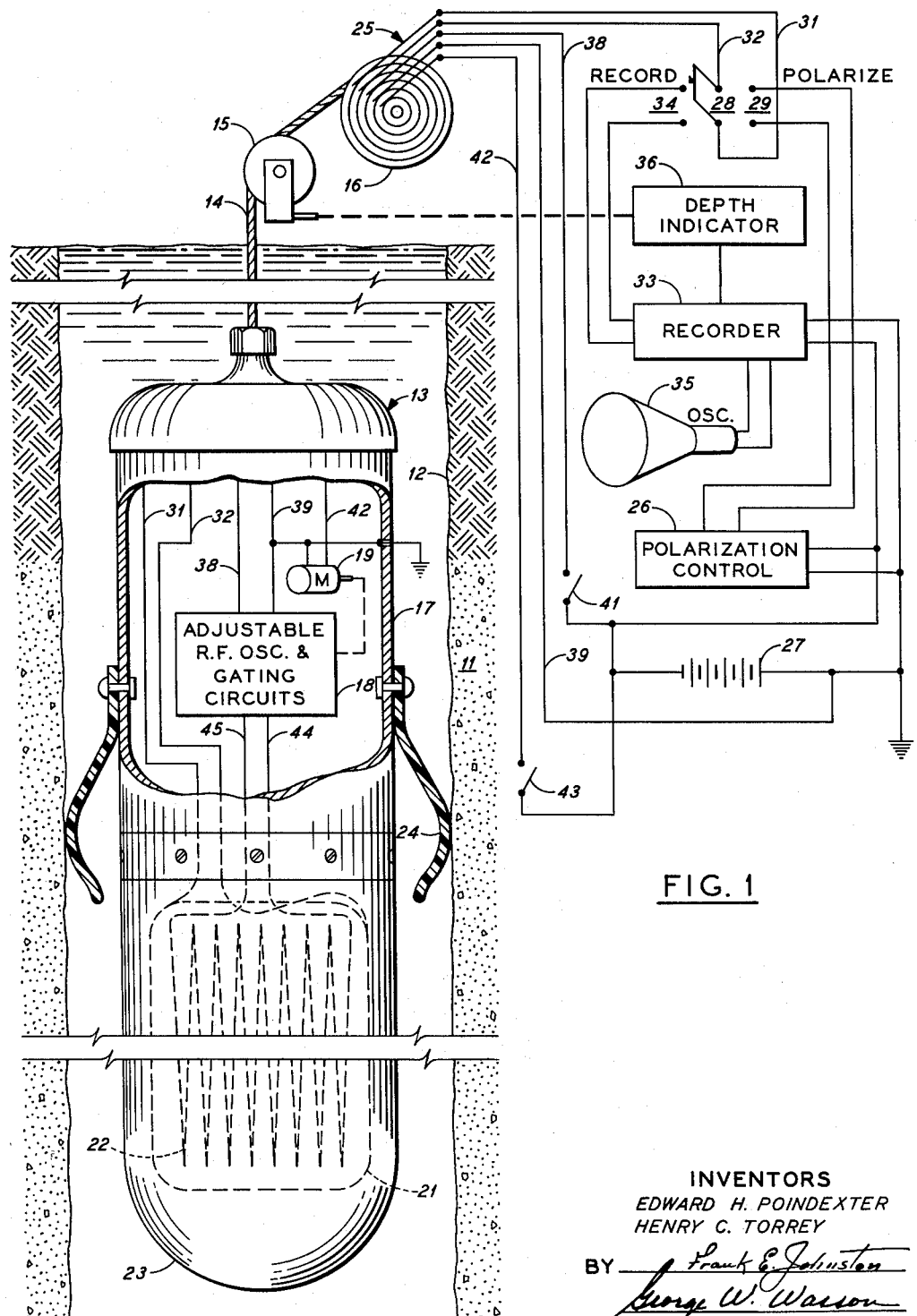
FIG. 1 is a schematic illustration of a nuclear magnetic relaxation logging tool including electronic circuitry for producing electron resonance effects on nuclear magnetic measurements of hydrogenous fluids within a penetrated earth formation.

In FIG. 1 an earth formation 11 penetrated by a well bore 12 is shown in section. A logging sonde 13 is supported within the well bore upon a cable 14 passing over a reel 15 and onto a cable drum 16. The logging sonde 13 comprises a nonmagnetic, and preferably nonmetallic, housing 17 enclosing an adjustable RF oscillator 18 and associated gating networks. A motor drive 19 is also included within the housing 17 as a means for adjustment of the frequency for oscillator 18. Suspended below the sonde 13 is a polarization coil 21 and an irradiation coil 22 embedded or encased within a material 23 having a low dielectric constant, as for instance Styrofoam or epoxy resin, so as to be light in weight and to provide an interior portion of low dielectric loss. A suitable plurality of resilient centering fingers 24 may be secured to the logging sonde 13 to maintain the tool in the center of the well bore as the logging operations are performed.

Cable 14 not only supports the sonde 13 but also provides electrical connections between the apparatus at the sonde and the controls at the earth surface. Slip rings 25 are provided on reel 16 to establish connection to the conductors of cable 14. At the earth's surface a polarization control 26 is provided for the coil 21 whereby energy may be derived from battery 27 through the polarization control to contact 29 of a double-pole, double-throw switch 28 and through conductors 31 and 32 to coil 21 within the well bore. Switch 28 may also connect coil 21 to a recorder 33 through contacts 34 so that detected signals from the coil 21 may be processed in the recorder 33 and may provide energization for a visual display means such as oscilloscope 35. An input is also provided to the recorder 33 from a depth indicator 36 mechanically driven by the reel 15 over which the cable 14 is carried to relate observed signals to a depth within the earth formation.

Energization for the adjustable radio-frequency oscillator 18 is provided by conductors 38 and 39 connected to battery 27 through switch 41. While switch 41 is shown as a toggle-type switch, it should be understood that its purpose is to control the energization of oscillator 18, and for that purpose it may take the form of a gating network rather than a simple switch. In its gating function it may control the energization of oscillator 18 to provide continuous energization or pulsed energization, as will be more fully described hereinafter. A conductor 42 and switch 43 connect the battery 27 to the motor 19 for frequency adjustment of the oscillator 18 so that rotation of the motor 19 may provide continuous adjustment of the frequency of the oscillator 18 or step by step adjustment to desired fixed frequencies.

The frequency of oscillation to which oscillator 18 should be adjusted will, in one method of logging, be substantially fixed and constant throughout a continuous well logging operation. This frequency, being dependent upon field strength, may be satisfactorily adjusted at the earth's surface prior to starting a logging run by a simple manual adjustment. If further adjustment should become necessary, the motor 19 may be energized to drive an adjustment device, such as a trimming capacitor, through suitable gear reduction units, not shown, at the logging sonde. Oscillator 18 is connected to coil 22 through conductors 44 and 45.

It should be understood that the apparatus as illustrated in the drawing is a greatly simplified form of the nuclear magnetism logging tool as illustrated in the aforementioned copending application of Baker et al., and a simplification of the electron paramagnetic resonance tool as illustrated in the aforementioned Unterberger application. Additional and more complex apparatus may be provided for the operation of the logging tool; however, the essential apparatus for the performance of the method of the present invention is illustrated in the drawing in an operative form.

The operation of the tool as illustrated in the drawings will now be described. As pointed out in the preliminary remarks, the effect to be observed through the use of the present apparatus is in effect a modified nuclear magnetism logging signal. To accomplish nuclear magnetic measurements in a well bore, it is necessary to polarize protons in the hydrogenous fluids within the earth formation. Polarization is accomplished by establishing within the formation surrounding the well bore a controlled magnetic field for the orientation of spinning protons. For that purpose, switch 28 is operated so that contacts 29 connect conductors 31 and 32 to the polarization control 26 and the battery 27. The polarization control 26 may include the necessary current and timing adjustments to provide the desired polarization patterns, as for instance polarization and relaxation fields, within the earth formation. After polarization has been accomplished, switch 28 may be rapidly switched to connect contacts 34 with conductors 31 and 32 to connect the coil 21 with recorder 33 where the nuclear magnetism signals may be processed for recording and for energization of the oscilloscope 35. It should be understood that the switch 28 is a simplified form of the switch that may be necessary to accomplish the rapid switching required for nuclear magnetism measurements as herein contemplated and, while shown as a double pull double throw switch, it should be understood that the switch may be any of many commercial varieties available to accomplish the rapid switching necessary and may in particular be of the form shown in the copending application of Brown et al., Serial No. 536,471, filed September 26, 1955, for "Switching Circuit." It should also be noted that while switch 28 is shown as at the earth's surface, it may more properly be within the sonde and be solenoid operated from the well head.

After an initial nuclear magnetism observation has been observed and analyzed indicating the presence of hydrogenous fluids within the earth formation adjacent to the well bore, the method of the present invention is accomplished by performing a second nuclear magnetism logging operation with the additional step of including irradiation of the earth formation with an oscillating electromagnetic field as produced from energization of the coil 22 by oscillator 18. The exact frequency to which the oscillator 18 should be adjusted is determined by the specific relationships between the strength of the magnetic field, the spectroscopic splitting factor, and the gyromagnetic ratio associated with the electrons in the specific substances within the earth formation. However, the spectroscopic splitting factor varies only slightly between the substances of interest here, and for practical purposes the precession frequency, or Larmor frequency, of the electrons will be equal to 657 times the Larmor frequency of protons in the same magnetic field. Furthermore, it is sufficient for the purposes contemplated here to adjust the oscillator 18 to a frequency within one percent of that frequency which is 657 times the precessional frequency of the protons in the same magnetic field. To accomplish this adjustment, the motor 19 may be energized from the battery 27 through conductor 42 and switch 43 to bring the oscillator to a desired frequency or, as previously described, the oscillator may be preadjusted at the earth's surface. When the oscillator has been adjusted to its proper frequency, the second nuclear magnetism logging operation may be performed with the addition of the irradiation of the formation with the radio-frequency electromagnetic energy. The irradiation may be performed in either of two time periods during the nuclear magnetism logging operation, since its effect is to modify the amount of polarization or to ocntrol observable duration, amplitude, or envelope shape of nuclear magnetism precessional signals. It may, for instance, be applied during the polarization interval; in which case, only those electrons in the region of the necessarily inhomogeneous polarization field whose frequency corresponds to the frequency of the applied electromagnetic energy will be affected. As an alternative, the electromagnetic irradiation may be applied during the subsequent relaxation or precession intervals to modify the net polarization or relaxation process, respectively, of polarized protons. A further alternative is to apply the electromagnetic field during both the polarization and precession intervals, accomplishing both of the features above identified, and another alternative is to apply a rapidly sweeping frequency between the limits of for instance 100 and 200 megacycles during the polarizing period, and 10 and 20 megacycles during the relaxation period to bring the frequency of the oscillator 18 into resonance with the precessing electrons in different regions of the formation surrounding the borehole that have been affected by corresponding different regional strength of the nonuniform polarization and relaxation fields.

In any of the above alternative operations of the oscillator 18, the essential effect observed is some alteration of the precessional decay signal from the protons in the hydrogeneous fluids within the earth formation due to an Overhauser effect as previously identified. The observation of a change in the amplitude or envelope shape of the nuclear magnetism signal with the irradiation of the formation, will indicate the presence of unpaired electrons within the hydrogenous fluids in the formation. A change in the nuclear magnetism signal may therefore be indicative of the molecular environment of the spinning protons contributing to the nuclear magnetism signal initially measured, and since this effect is due only to uncompensated electrons within the atomic structure, it may be concluded where a modified nuclear magnetism signal is observed that the hydrogenous fluid within the formation contains free radicals and includes a hydrocarbon crude.

Figure 2:
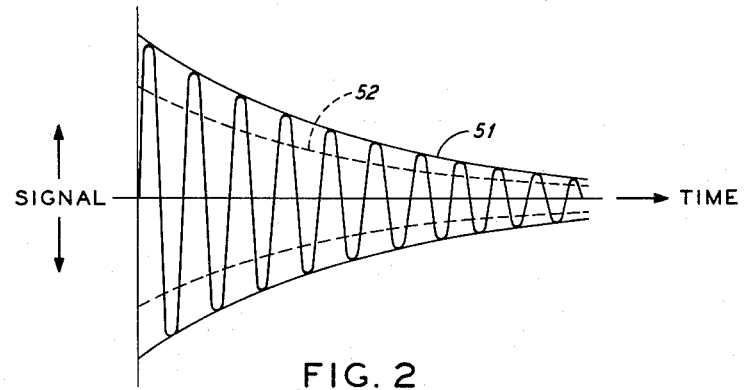
FIGS. 2 and 3 are waveform patterns of the resultant nuclear magnetism logging signals that result from the performance of the method of the present invention during logging of an earth formation.
Figure 3:
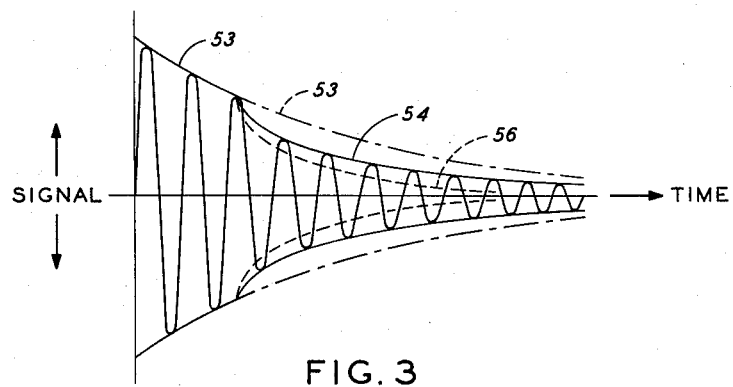

FIGS. 2 and 3 illustrate representative waveforms to be observed during the performance of the method of the present invention. In FIG. 2, the full line envelope signal designated 51 is representative of an unmodified nuclear magnetism precession signal having an observable amplitude in ordinate direction and time duration in abscissa direction. The dotted envelope signal 52 is representative of a second nuclear magnetism signal as modified by the interaction between nuclear and unpaired electron coupling mechanisms. FIG. 2 is representative of a signal to be observed when the irradiation of the earth formation is provided during the polarization period of a nuclear magnetism logging operation.

Figure 4:
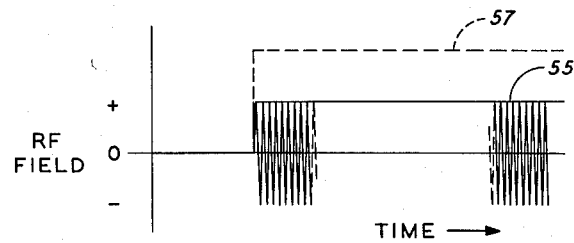
FIG. 4 is a graphic illustration of the irradiation timing to produce the nuclear magnetism signals of FIG. 3.

FIG. 3 illustrates representatve waveforms as may be detected with irradiation of the earth formation during the precession period as shown in FIG. 4. Envelope 53, shown partially in dot-dash form, illustrates a conventional precession signal; envelope 54, in solid line, illustrates a modified nuclear magnetism precession signal as may be produced with the irradiation strength of waveform 55 of FIG. 4; and envelope 56, shown in dotted form, illustrates a modified nuclear magnetism precession signal as may be produced with the irradiation strength as shown in dotted lines at 57 of FIG. 4.

While the preceding description has been directed primarily to the measurement of precessional signals from precessing polarized protons and the effect of irradiation of the formation with radio-frequency electromagnetic energy during a second nuclear magnetism logging operation, it should be understood that the effects contributing to the modification of the nuclear magnetism signal when an irradiation is provided may also be observed whether the observations are free precession observations or nuclear resonance absorption observations or by pulsed transient techniques other than free precession. Furthermore, the Overhauser effect may be observed not only on the proton signals but also upon the indirect observation of the nuclear reaction on an electron paramagnetic resonance measurement, or the combination of both the proton and electron spin measurement techniques.

While a certain preferred embodiment of the invention has been herein specifically disclosed in the form of an apparatus and method of operation thereof, it is intended that the invention should not be limited to the appaartus as shown, but that the invention is to be given its broadest possible interpretation within the terms of the following claims.

We claim:

1. The method of logging an earth formation penetrated by a well bore for the presence of hydrogen nuclei in the form of water and crude oil comprising the steps of
   (a) performing a first nuclear magnetism well logging operation within said well bore to polarize hydrogen nuclei in the form of water and crude oil present in said formation,
   (b) detecting nuclear magnetism precessional signals from precessing protons in said polarized nuclei as a result of said first logging operation,
   (c) repeating said nuclear magnetism logging operation to again polarize said hydrogen nuclei and, during at least a portion of said repeated nuclear magnetism logging operation, irradiating said earth formation with an oscillating electromagnetic field, said electromagnetic field having a frequency and field strength capable of resonance with precessing unpaired electrons associated with crude oil hydrogen nuclei within said formation,
   (d) detecting nuclear magnetism precessional signals from precessing protons in said polarized nuclei as a result of said repeated logging operation,
   (e) comparing said first and second detected signals as an indication of the molecular environment within said well bore of the hydrogen nuclei contributing to said detected precessional signals, and distinguishing crude oil from water nuclei by the existence of a change in the second detected precessional signal attributed to said irradiation during said repeated nuclear magnestism logging operation.

2. The method of logging an earth formation penetrated by a well bore comprising the steps of establishing a polarizing field of predetermined strength in said earth formation from within said well bore to polarize the protons within hydrogenous fluids in and around said well bore, said polarized protons having a frequency of precession about said polarizing field dependent upon the strength of said field, interrupting said polarizing field to permit said polarized protons to precess about a precession magnetic field angularly spaced with respect to said polarizing field, detecting a signal of precession of said polarized protons about said second field, indicating at least certain characteristics of said detected precession signal, again polarizing said protons within said earth formation with a polarizing field of said predetermined strength, during said second polarization step irradiating said earth formation with an oscillating electromagnetic field having a frequency substantially 657 times the frequency of precession of said protons during said first and second polarization steps, terminating said second polarization and said electromagnetic field irradiation, detecting a second signal of precession of said polarized protons about said precession field, indicating the same characteristics for said second precession signal, and comparing said characteristics of said two precession signals as an indication of the molecular environment of said precessing protons within said earth formation.

3. The method of logging an earth formation penetrated by a well bore comprising the steps of establishing a polarizing field from within said well bore to polarize the protons within hydrogenous fluids in and around said well bore, interrupting said polarization field, detecting nuclear magnetism processional signals from said polarized protons from within said well bore, indicating at least certain characteristics of said detected precessional signals, repeating said polarization and interruption steps, irradiating the earth formation with an oscillating electromagnetic field having a frequency and field strength capable of resonance with precessing unpaired electrons associated with hydrogenous fluids within said earth formation during the precessional period for protons polarized during said repeated polarization and interruption periods, detecting nuclear magnetism signals from said precessing protons, indicating the same characteristics of said second detected nuclear magnetism signals, and comparing said characteristics of said first and second detected signals as an indication of the molecular environment of the protons within said formation.

4. The method of claim 3 wherein the frequency of oscillation of said electromagnetic field is 657 times the frequency of said nuclear magnetism precessional signals from said first logging operation.

5. The method of logging an earth formation penetrated by a well bore comprising the steps of applying a polarizing field from within said well bore to polarize the protons within the fluids in and around said well bore, terminating said polarization field, detecting nuclear magnetism signals from precessing polarized protons, indicating at least certain characteristics of said detected nuclear magnetism signals, irradiating said formation with an oscillating frequency electromagnetic field having a frequency and field strength capable of resonance with precessing unpaired electrons associated with said fluids within said earth formation, during said irradiation initating a second polarization field within said well bore, terminating said second polarization field, detecting nuclear magnetism signals from precessing protons polarized by said second polarization field, indicating the same characteristics of said second detected nuclear magnetism signals, and comparing said characteristics of said first and second nuclear magnetism signals as an indication of the molecular environment of said protons within said earth formation.

6. The method of logging an earth formation penetrated by a well bore comprising the steps of applying a polarization field from within said well bore to polarize protons within hydrogenous fluids in and around said well bore, interrupting said polarization field, detecting nuclear magnetism signals from precessing polarized protons, indicating at least certain characteristics of said nuclear magnetism signals, initiating a second polarization field within said earth formation, irradiating said earth formation with an oscillating electromagnetic field having a continuously varying frequency resonating with precessing uncompensated electrons in all regions of said second polarization field, terminating said second polarization field, detecting the precession of polarized protons from said second polarization, indicating the same characteristics of said second detected precessional signal, and comparing said characteristics of said first and second indicated precessional signals as an indication of the molecular environment of said protons within said formation.

7. The method of logging an earth formation penetrated by a well bore comprising the steps of establishing a polarizing field in said earth formation from within said well bore to polarize the protons within hydrogenous fluids in and around said well bore, interrupting said polarizing field to permit said polarized protons to precess about a second magnetic field angularly spaced with respect to said polarizing field, detecting said precession, indicating at least certain characteristics of said precessional signal, again polarizing said protons within said earth formation, during said second polarization step irradiating said earth formation with an oscillating electromagnetic field having a continuously varying frequency resonating with precessing uncompensated electrons in all regions of said second polarization field, terminating said second polarization and said electromagnetic field irradiation, detecting a second precession of said polarized protons, indicating the same characteristics for said second precessional signal, and comparing said characteristics of said two precession signals as an indication of the molecular environment of said protons within said earth formation.

8. The method of quantitatively analyzing an earth formation for the presence therein of petroleum crudes comprising the steps of performing a first nuclear magnetism well logging operation from within a well bore penetrating said earth formation including establishing a magnetic field for polarizing protons within the nucleus of hydrogenous fluids within said formation, terminating said polarizing field, detecting nuclear magnetism signals from precessing protons within said formation, and indicating at least certain characteristics of said precessional signal, repeating said nuclear magnetism logging operating including said polarization, termination, detection and indication steps with the additional step of irradiating said earth formation with a radio frequency electromagnetic field of predetermined frequency, strength and duration capable of resonance with precessing unpaired electrons associated with petroleum crudes within said earth formation during at least a part of said repeated logging operation, and comparing said first and second indicated certain characteristics of said precessional signals and said frequency, strength and duration of said irradiating field to determine the quantitative presence of petroleum crude within said formation.

9. The method of distinguishing crude oil from water in a portion of an earth formation penetrated by a well bore comprising
   (a) the steps of performing a first nuclear magnetism well logging operation on said portion of said earth formation from within said well bore, said operation including establishing a magnetic field for polarizing protons within the nucleus of hydrogenous fluid atoms within said formation and causing precession of said protons,
   (b) detecting a signal characteristic representing said precession of said protons during said first well logging operation, and indicating a representation of said first detected signal,
   (c) performing a second nuclear magnetism well logging operation on the same portion of said well bore, said second operation including establishing said magnetic field for polarizing said protons and causing said precession of said protons,
   (d) during said second logging operation, irradiating said formation with an oscillating electromagnetic field having a frequency and field strength capable of resonance with precessing unpaired electrons associated with crude oil within the same portion of said earth formation,
   (e) detecting a signal characteristic representing said precession of said protons during said second well logging operation, and indicating a representation of said second detected signal,
   (f) comparing said first and second indicated signal representations,
   (g) and detecting a change in said second indicated signal attributable to said irradiation during said second well logging operation as an indication that at least a portion of said precessing protons are present in the nuclei of crude oil within said formation.

References Cited in the file of this patent
FOREIGN PATENTS

| 1,141,373 | France | Mar. 18, 1957 |
| 1,015,954 (Appl.) | Germany | Sept. 19, 1957 |

OTHER REFERENCES

Carver et al.: Physical Review, vol. 92, No. 1, pages 212 and 213, Oct. 1, 1953.

Carver et al.: Physical Review, vol. 102, No. 4, pages 975, 980, May 15, 1956.

Herzog et al.: Physical Review, vol. 103, No. 1, July 1956, pp. 148 to 166.

Gutowsky et al.: Journal of Chemical Physics, vol. 28, No. 4, Apr. 1958, pp. 744 and 745.

Erb et al.: Academie des Sciences, Comptes Rendus, vol. 246, No. 14, Apr. 9, 1958.